United States Patent [19]
Kashiwagi

[11] Patent Number: 5,148,993
[45] Date of Patent: Sep. 22, 1992

[54] METHOD FOR RECYCLING TREATMENT OF REFUSE OF PLASTIC MOLDED ARTICLES AND APPARATUS THEREFOR

[76] Inventor: Hidehiro Kashiwagi, 3-2, Icchoji, Oharacho, Tokushima-shi, Japan

[21] Appl. No.: 703,382

[22] Filed: May 21, 1991

[30] Foreign Application Priority Data

Dec. 27, 1990 [JP] Japan .................................. 2-416561

[51] Int. Cl.$^5$ ............................ B28B 17/00; B03B 9/06
[52] U.S. Cl. ................................. 241/24; 241/79.1; 241/DIG. 38
[58] Field of Search ................ 209/12, 44.1; 241/19, 241/24, 79.1, 99, DIG. 38

[56] References Cited

U.S. PATENT DOCUMENTS

| | | | |
|---|---|---|---|
| 3,741,863 | 6/1973 | Brooks | 241/24 X |
| 4,043,513 | 8/1977 | Hoberg et al. | 241/DIG. 38 X |
| 4,094,272 | 6/1978 | Hillekamp et al. | 209/12 |
| 4,932,595 | 6/1990 | Cohen et al. | 241/99 |
| 5,060,870 | 10/1991 | Trezek et al. | 241/19 |

Primary Examiner—Douglas D. Watts
Attorney, Agent, or Firm—Flynn, Thiel, Boutell & Tanis

[57] ABSTRACT

A method for recycling treatment of refuse of plastic molded articles, e.g. polyethylene terephthalate bottles comprises immersing the refuse into hot water of 70°–100° C. while agitating to detach and remove bottom coverings of dissimilar plastics, detaching paper labels on the plastic articles by steam injection, breaking the detached labels and the plastic articles into fragments, separating the mixture by wind-force sorting to remove most of the labels, further separating the fragments of plastic articles and residual labels by flying sorting to obtain the fragments only of the plastic articles, cleaning the fragments of the plastic articles by ultrasonic energy to remove all impurities, and preparing the purified plastic articles as chip or pellet plastic material. Apparatus for performing the method is characterized by comprising a hot water tank and push impellers for immersing and agitating the refuse in hot water to detach and remove the coverings, a steam injection machine and an agitator for injecting steam against the labels to detach them, a wind-force separator and a flying separator for separating out the labels completely to obtain fragments only of the plastic articles, the former having guide plates and a blower, the latter having a flying rotary bar with fin members. The push impellers are of a square drum having vane-like projections.

7 Claims, 1 Drawing Sheet

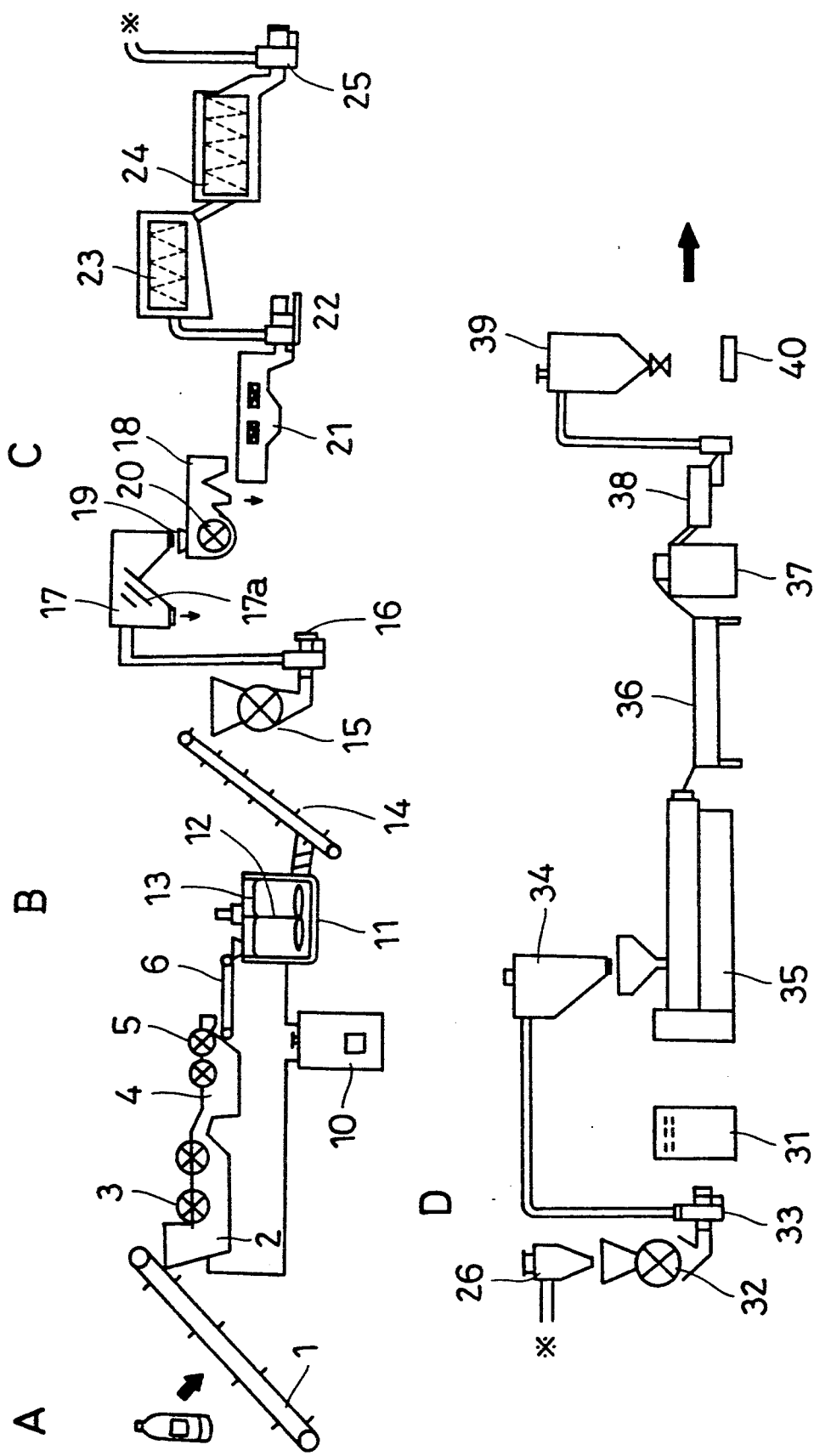

METHOD FOR RECYCLING TREATMENT OF REFUSE OF PLASTIC MOLDED ARTICLES AND APPARATUS THEREFOR

BACKGROUND OF THE INVENTION

1. Field of the Invention

This invention relates to a method of conducting recycling treatment of refuse of plastic molded articles such as plastic bottles, particularly polyethylene terephthalate bottles to produce a chip or pellet material of the plastics for recycling, and an apparatus therefor. More particularly, this invention provides a consecutive, automatized method and apparatus for recycling treatment of refuse of plastic molded articles which have paper labels laminated with adhesive thereon and may have protective coverings of dissimilar plastics at the bottom portions thereof, wherein the paper labels and protective coverings are completely detached and removed, and the adhesive, stain and foreign matters are cleaned off, whereby purified original plastic material for recycling is regenerated.

2. Statement of Prior Art

Recent trend of vessels for a variety of beverages is that plastic bottles, particularly polyethylene terephthalate (hereinafter abbreviated as "PET") bottles supersede glass bottles from the respects of lightweight, convenience, little failure to break, disposability, etc. and their production quantity is on the increase. For vessels for various seasonings, cosmetics, detergents, medicines, etc., blow molded bottles of other plastics such as polyvinyl chloride, polyolefins, etc. as well as glass bottles are used in tremendous quantity.

Empty bottles of these plastics after use are mostly delivered as domestic refuse or rubbish, which not only leads to waste of resources, but also accelerates increase in plastics refuse which accounts for a large part of the refuse increment, and the increase of plastics refuse makes the problem of refuse treatment and disposal more difficult.

In general, plastics refuse is treated by incineration or disposed of by reclamation as such. In the former case, upon burning, incinerators are liable to be damaged owing to significant loading, and various noxious gases and toxic substances such as dioxines are produced, which facts pose a problem unsolved. In the latter case, for example, plastic blow-molded vessels have a small apparent specific gravity and accordingly, their refuse has such a bulky volume that huge final disposal sites are necessitated. Another problem of plastic refuse is that most plastics are stable and are not decomposed forever in the reclaimed ground.

As a consequence, the increased discharge of plastics refuse surpasses greatly the limit of disposal capacity of refuse incinerators and necessitates many final disposal sites of extensive area and many incineration places. Nevertheless, acquisition of new incineration and disposal sites is increasingly difficult and moreover, leads to aggravation of environmental pollution. Therefore, nowadays, it is urgent important problem to expedite the reduction of refuse, particularly plastics refuse.

In order to solve the baffling problem, the tendency of the times is toward reducing refuse as far as possible thus minimizing waste of resources and preserving the environment from the global viewpoint. The thinking is changing from throwaway of various kinds of resources toward recycling and reuse. To that end, a variety of approaches are being attempted also in the industrial field.

For the reduction of refuse, attempts to recycling have recently began of plastics empty bottles that are bulky and discarded in tremendous number, for example, PET empty bottles. At the present, however, any system of large-scale industrial recycling treatment for them has not yet been practiced.

This invention is therefore aimed at providing a method and an apparatus for recycling treatment of waste plastic molded articles, particularly empty bottles of PET, which method and apparatus enable to offer pellets or chips of its original plastics, thus again utilizing them as a raw material for the production of plastic molded articles.

In particular, this invention has for an object to provide a method and apparatus for recycling treatment of refuse of plastic shaped articles, which are industrially and consecutively practiced and automatized.

SUMMARY OF THE INVENTION

The recycling treatment method for attaining the aforementioned object is designed for waste of plastic shaped articles, notably empty bottles made of plastics such as PET, polyvinyl chloride. These plastic empty bottles have paper labels usually laminated with hot-melt adhesive thereon and eventually may have further reinforcing protective coverings of dissimilar plastics such as polyethylene at the bottom parts thereof. The empty bottles usually contain therein a trace amount of residual contents, stain such as mold, and foreign objects. The paper labels, adhesive, dissimilar plastic protective coverings, stain, foreign objects, etc. are useless and should be separated and removed in the treatment procedure from the bodies of bottles to be recycled.

This invention is characterized by a method and means for the separation and removal of these useless matters. That is to say, the recycling treatment method for refuse of plastic molded articles having paper labels laminated with adhesive and eventually having dissimilar plastic protective coverings at the bottom portions thereof comprises the sequential stages and steps of:

A. removal stage of the dissimilar plastic coverings including
   (a) immersing the refuse of plastic shaped articles in a hot water bath of 70°-100° C. while agitating to release the protective coverings and simultaneously to clean off grossly stained and foreign matters clinging to the plastic articles, and
   (b) separating and removing the protective coverings, B. removal stage of the paper labels including
   (c) injecting steam against the paper labels on the plastic articles freed of the coverings to release the paper labels from bodies of the plastic articles,
   (d) breaking the detached paper labels and the bodies of plastic articles into fragments,
   (e) separating roughly the plastic articles bodies from the paper labels by wind-force sorting to obtain a plastics portion in which the plastics bodies predominate,
   (f) further separating the plastics portion by flying sorting to remove completely the residual labels mixed therein and obtain the fragments of the plastics bodies, C. cleaning and purifying stage including
   (g) cleaning the plastics body fragments freed of the labels and coverings in cleaning water by irradiation of ultrasonic energy to remove the residual stain, foreign matters and adhesive completely, D. preparation stage of recycling material including
   (h) further comminuting the plastics body fragments substantially free of impurities into small pieces, and
   (i) preparing the small pieces of plastics as chips or pellets for recycling material.

The recycling treatment apparatus for waste of plastic shaped articles having paper labels laminated with adhesive thereon and eventually having dissimilar plastic protective coverings at the bottom parts thereof comprises:

A. removal station of the bottom protective coverings,
B. removal station of the paper labels,
C. ultrasonic cleaning station of bodies of the shaped articles, and
D. preparation station of recycling material as chips or pellets, the removal station A of the protective coverings including a hot water tank internally equipped with push impellers for softening and releasing, under agitation, the protective coverings and a separation tank for separating the plastic articles only, the removal station B of the paper labels including a steam injection machine for injecting steam against the paper labels to release them from bodies of the plastic articles, the steam injection machine being of a rotary mesh drum and having an agitator, a breaker for breaking the mixture of the released labels and the plastics bodies thus resulted into fragments, a wind-force separator having guide plates for separating roughly the plastics bodies from the paper labels to remove most of the paper labels, and flying separator having a flying rotary bar for further separating the fragments of plastics bodies only from the residual paper labels to be removed.

According to the recycling treatment system of this invention, in the removal station A of protective coverings, the shaped article body of plastics, e.g. PET and the protective covering of dissimilar plastics, e.g. polyethylene exhibit different actions to hot water, because the former has a high melting point (e.g. 246° C.) and the latter has a low softening point (e.g. 70°-100° C.), and consequently, the latter only undergoes the action of hot water to soften and release from the former. The protective coverings can thus be separated out readily by specific gravity separation.

In the removal station B of paper labels, the paper labels are released by steam jet from the hot-melt adhesive, and accordingly, the bodies of shaped articles, but are mixed with them at this stage. The paper labels are separated and removed at the subsequent wind-force sorting step (e) and flying sorting step (f). In the wind-force sorting step (e), the paper label fragments and the fragments of plastics bodies, when delivered by air blowing, diffuse and fall in mutually different ways, so that both are roughly sorted into a label fraction in which the paper label fragments dominate and a plastics fraction in which the fragments of plastics bodies dominate, whereby most of the paper labels is separated out. On the other hand, in the next flying sorting step (f), the plastics fraction is further separated clearly into the fragments of plastics bodies and residual part of the paper label fragments by the difference in flying ability. Thus, the paper labels can be removed completely.

In the ultrasonic cleaning station C, the remaining hot melt adhesive, foreign matters and stain are cleaned out whereby the fragments of purified plastics bodies substantially free of impurities and other mixture are ultimately obtained.

BRIEF DESCRIPTION OF THE DRAWINGS

The single figure is a schematic view showing one example of a recycling treatment apparatus according to this invention.

DETAILED DESCRIPTION OF PREFERRED EMBODIMENTS

The invention will be hereinbelow described in more detail with reference to the accompanying drawing.

The following example is concerned with recycling treatment of empty bottles made of PET, but this invention is of course not restricted to this example, and also applicable to refuses of blow molded bottles of other plastics, e.g. PVC and other kinds of plastic molded articles such as various casings.

In the figure, a recycling treatment apparatus for continuously treating refuse of PET bottles having polyethylene protective coverings at their bottom parts and paper labels attached thereon is schematically shown.

In the removal station A of the protective coverings, the empty bottles of PET recovered and collected are fed through a feed conveyor 1 into a hot water tank 2 holding hot water of 70°-100° C. In the hot water tank 2, two or more push impellers 3 for agitation are installed in parallel to push the PET bottles into a hot water bath where the PET bottles are soaked and agitated sufficiently, and accordingly, the protective coverings are softened and released. Each of the push impellers 3 is of a rotary square drum, such as a rectangular parallellepiped drum, having on its surface vane-like protrusions. With the revolving square drum and vanes, the protective coverings can be detached readily. The polyethylene coverings thus softened and released are separated easily from the PET bottles because of specific gravity difference (0.92-5 of the former and 1.34 of the latter), and the PET bottles only are transferred next to a separation tank 4 communicating with the hot water tank 2. The separatory tank 4 is provided with discharge impellers 5, with which the PET bottles freed of the coverings are transferred through a transfer conveyor 6 to the removal station B of paper labels. The discharge impellers 5 each have a plurality of paddles mounted radially on a rotary shaft in radially and horizontally spaced relation, and serve to discharge and transfer the PET bottles to the next step.

In the hot water tank 2, hot water is supplied from a boiler 10. The boiler 10 also serves to supply a steam injection machine 11, as later mentioned, with steam.

In the removal station B of paper labels, in the steam injection equipment 11 where steam is supplied from the boiler 10, steam jet is injected against the paper labels laminated with adhesive on bodies of the PET bottles, and the paper labels are detached from the bottle bodies.

The steam injection machine 11 is constructed of a rotary mesh drum and internally equipped with a stirrer 12 so that the paper labels and the bottle bodies can be sufficiently injected by and exposed to steam. At the upper part of the equipment, there is provided a plate 13 for prevention of steam diffusion outside in order to minimize the loss of steam.

The bodies of PET bottles mixed with the detached paper labels are transferred on a conveyor 14 to a breaker 15. The breaker 15 is preferably of medium-speed type one including a rotary blade and fixed blade. The bodies of PET bottles and the paper labels are broken into fragments of about 3-4 cm size by means of the breaker 15.

The resulting mixture of the bottle body fragments and the paper label fragments is then transferred by means of a blower 16 through a pipeline to a wind-force separator 17, where the mixture is roughly separated into a label portion in which the paper label fragments dominate and a PET portion in which the fragments of PET bottle bodies dominate.

The wind-force separator 17 is provided with guide plates 17a, and air is blown into the separator 17 through the blower 16. By the blast air, the paper label fragments are fallen short of the guide plates 17a whereas the PET fragments are flown to a distant place beyond the guide plates and fallen, whereby both are roughly separated. In this way, about 70% of the paper labels are removed.

The PET portion containing a major part of the bottle body fragments and a minor part of unremoved label fragments is further transferred to a flying separator 18 for further sorting.

A constant feed adjustment plate 19 is installed above the flying separator 18 so that a major part of the bottle body fragments mixed with a minor part of the label fragments may be fed in a constant quantity to the separator 18.

The flying separator 18 is provided therein with a flying rotary bar 20 having a plurality of fin-like members, for example, of inverse L-like form (Γ) or deformed A-like form (A) around it. These fin members serve to prevent, when the bar 20 is revolved for hitting, the generation of wind which impedes the flying separation.

The fragments of bottle bodies mixed with a minor proportion of residual label fragments are hit and flown by means of the flying rotary bar 20. At this time, since the former is flown to a distant place and the latter is flown only near, the bottle body fragments only are separated from the residual label fragments owing to the difference in flying distance. The mass of bottle body fragments thus recovered and freed of both coverings and labels is charged directly into an ultrasonic cleaning equipment 21.

The mass of bottle body fragments contains still a small amount of residual stain, foreign objects and hot-melt adhesive. In order to clean off these impurities, in the cleaning station C, ultrasonic energy is applied to the bottle body fragments in cleaning water in the equipment 21 and complete cleaning is performed. Thereafter, they are dryed with a dryer 24 to remove excess water contents. From the dryer 24 they are transferred via a pipeline into a cyclone 26 by means of a transporting blower 25 and they are dryed completely.

The dried bottle fragments are thus freed of all the unnecessary objects and impurities, and subsequently fed to the recycling material preparation station D. Here, either of a route to pellet material or a route to chip material is chosen by a control panel 31.

In case where pellet material is intended, the bottle body fragments of PET are discharged from the cyclone 26 to a comminuting machine 32, where they are further comminuted to small pieces of a size of less than 1 cm. A mass of the small pieces of PET bottle bodies obtained is charged through a transporting blower 33 into a reservoir tank 34, from where they are fed to an extruder 35. In the extruder 35, the mass is melted and extruded through an extruding die as a rod and cooled in a water tank 36. Thereafter the extruded material is pelletized in a pelletizer 37 into pellets having a length of 3-5 mm and a diameter of 2-3 mm. The pellets are further classified by means of a classifying loader 38 and homogeneous pellets of the aforementioned size are selected.

The classified pellets are transferred and stocked in a reservoir tank 39. A definite amount of the pellets in the reservoir tank 39 is weighed with a weighing equipment 40 and ultimately packaged as a PET pellet material for recycling.

Where chips are intended, the small pieces of PET bottle bodies are similarly comminuted by means of a pulverizer (not shown) to further chip-like fine pieces (less than 1 cm, ca. 8 mm on the average), and a definite amount of the chip material is packaged as a PET material for recycling.

The example described above is concerned with recycling treatment of refuse of PET bottles in their initial form, but this invention is applicable likewise to the bottles in pressed form or half-cut form. In that case, it is possible to operate the system described above similarly except that the hot water tank 2 and the steam injection machine 11 are interchanged, and accordingly, the paper labels are removed first and the protective coverings are later removed.

The method and apparatus of this invention is further applicable to refuse of PET bottles having no protective coverings, or to a mixed refuse of PET bottles with protective coverings and PET bottles without them.

In situations where refuse of only PET bottles having no dissimilar plastic coverings is selectively collected, a water tank holding water at normal temperature may be used instead of the hot water tank 2 in the station A. Otherwise, the station A can be omitted as the case may be, and the bottle refuse is charged directly into the steam injection machine 11 from the feeding conveyor 1.

In the label removal station B, in the example shown in the figure, after detachment of the paper labels in the steam injector 11, the bottle bodies mixed with a minor part of residual paper labels are immediately transferred to the breaker 15 and then, both are mutually separated at two steps of rough and fine separations, thus removing the residue paper label fragments.

However, another example is also possible, wherein after the release of the labels in the steam injector 11, a major proportion of the paper labels (about 70%) is separated and removed in the first wind-force separator 17, the bottle body portion including a predominant part of the bottle bodies and a minor part of the residual labels is broken in the breaker 15 and thereafter, the residual part of the label fragments is separated out completely in the second flying separator 18. To that end, the wind-force separator 17, breaker 15 and flying separator 18 can be arranged in this order.

The mass of paper label fragments separated out at the wind-force separator 17 may contain a small part of the fragments of PET bottle bodies. Where the small part of the PET fragments in the mass is desired to be recovered, another similar wind-force separator can be further installed below the wind-force separator 17 thereby to conduct two-tier separation, whereby a small part of the PET fragments are obtained. Otherwise, the mass of paper label fragments separated out can be returned to the breaker 15 followed by transfer to the wind-force separator 17 for again sorting, where necessary.

According to the recycling treatment and apparatus of this invention, it is possible to treat refuse of plastic molded articles, e.g. empty bottles in large quantity and efficiently by the continuous, automatized steps, and consequently, this invention can aid significantly in recycling of resources and reducing refuse or rubbish and serves to saving of resources and reservation of the environment.

What is claimed is:

1. A method for recycling treatment of refuse of plastic molded articles which have paper labels attached thereto with adhesive and may have reinforcing protective coverings of dissimilar plastics at the bottom portions thereof, which method comprises the sequential steps of:
    (a) immersing and agitating the refuse of plastic molded articles in a hot water bath to soften and release the protective coverings and simultaneously to remove stain and foreign matter clinging to the plastic molded articles,
    (b) separating out and removing the protective coverings,
    (c) injecting steam against the paper labels on the plastic articles freed of the coverings to release the paper labels from the plastic molded articles,
    (d) breaking the paper labels and the plastic molded articles into fragments,
    (e) separating the paper labels and the plastic molded articles by wind-force sorting into a label portion in which the paper labels predominate and a plastics portion in which the plastic molded articles predominate and removing the label portion,
    (f) further separating the fragments of plastic molded articles only from the plastics portion by flying sorting thereby to remove completely the residual paper label fragments,
    (g) cleaning the resulting fragments of plastic molded articles now free of the labels in cleaning water by irradiation of ultrasonic energy to completely remove any residual stain, foreign matter and adhesive,
    (h) comminuting the fragments of plastic molded articles now substantially free from impurities further into small pieces, and
    (i) preparing the small pieces of the purified plastic articles as chips or pellets for a recycling material.

2. The method for recycling treatment as set forth in claim 1, wherein said refuse of plastic molded articles is a refuse of polyethylene terephthalate bottles and said dissimilar plastics is polyethylene.

3. The method for recycling treatment as set forth in claim 1, wherein said hot water bath has a temperature of 70°-100° C.

4. The method for recycling treatment as set forth in claim 1, wherein said step (d) is conducted subsequently of said step (e), said wind-force sorting between the paper labels and the plastic articles causing said label portions to be first separated out, and thereafter, said plastic portions are broken into fragments.

5. The method for recycling treatment as set forth in claim 1, wherein in said step (d) the fragments have a size of 3–4 cm and in said step (h) the small pieces have a size of 1 cm or less.

6. An apparatus for recycling treatment of refuse of plastic molded articles having paper labels attached with adhesive thereon and may have protective coverings of dissimilar plastics at their bottom portions, said apparatus comprising:
    a first removal station for removing the protective coverings;
    a second removal station for removing the paper labels;
    an ultrasonic cleaning station for cleaning fragments of said plastic molded articles freed of the coverings and the labels and removing completely residual impurities;
    said first removal station including a hot water tank for softening and releasing the protective coverings therein and push impellers, provided in the tank, for forcing an immersion of the refuse in hot water in the tank and agitating the refuse to effect a release and removal of the coverings;
    said second removal station including a steam injection means for injecting steam against the paper labels to release them from the plastic molded articles, said injection means being of a rotary mesh drum and having therein an agitator;
    a third station for preparing small pieces of the purified plastic molded articles as pellets or chips for recycling material, said third station including a breaker for breaking a mixture of the released paper labels and the plastic molded articles into fragments;
    a wind-force separator for separating and sorting the mixture into the fragments of paper labels and fragments of plastic molded articles separate from the fragments of paper label fragments, said separator having guide plates; and
    a flying separator for further separating completely the fragments of plastic molded articles only from the residual paper label fragments.

7. The apparatus for recycling treatment as set forth in claim 6, wherein said push impellers of the hot water tank are each of a square drum having thereon vane-like projections; and wherein said flying separator includes a flying rotary bar and a plurality of fin-like members therearound.

* * * * *